(12) United States Patent
Chen et al.

(10) Patent No.: US 10,912,144 B2
(45) Date of Patent: Feb. 2, 2021

(54) METHOD TO REDUCE ACCESS DELAY

(71) Applicant: MEDIATEK INC., Hsin-Chu (TW)

(72) Inventors: Yih-Shen Chen, Hsin-Chu (TW);
Chun-Fan Tsai, Hsin-Chu (TW);
Chia-Chun Hsu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/406,168

(22) Filed: May 8, 2019

(65) Prior Publication Data
US 2019/0350032 A1 Nov. 14, 2019

Related U.S. Application Data

(60) Provisional application No. 62/668,882, filed on May 9, 2018.

(51) Int. Cl.
| | | |
|---|---|---|
| *H04W 76/27* | (2018.01) | |
| *H04W 76/11* | (2018.01) | |
| *H04W 72/14* | (2009.01) | |

(52) U.S. Cl.
CPC .......... *H04W 76/27* (2018.02); *H04W 72/14* (2013.01); *H04W 76/11* (2018.02)

(58) Field of Classification Search
CPC ..... H04W 76/27; H04W 76/11; H04W 72/14; H04W 36/08; H04B 17/309
See application file for complete search history.

(56) References Cited

U.S. PATENT DOCUMENTS

| | | | |
|---|---|---|---|
| 2012/0106460 A1 | 5/2012 | Yang et al. | 370/328 |
| 2013/0064192 A1 | 3/2013 | Iwamura et al. | 370/329 |
| 2013/0159021 A1* | 6/2013 | Felsher | G06F 21/6245 |
| | | | 705/3 |

(Continued)

FOREIGN PATENT DOCUMENTS

| | | |
|---|---|---|
| CN | 104919883 A | 10/2012 |
| WO | WO2015085460 A1 | 12/2013 |

OTHER PUBLICATIONS

International Search Report and Written Opinion of International Search Authority for PCT/CN2019/086151 dated Jul. 29, 2019 (9 pages).

(Continued)

*Primary Examiner* — Wei Zhao
(74) *Attorney, Agent, or Firm* — Imperium Patent Works; Zheng Jin

(57) ABSTRACT

A method to speed up uplink data access during a radio resource control (RRC) reconfiguration procedure is proposed. UE first sends an RRC request, and in response receives an RRC reconfiguration message from BS. UE then decodes the RRC reconfiguration message and performs reconfiguration. UE also waits for UL grant for transmitting RRC reconfiguration complete with UL data if available. In one embodiment, BS provides the UL grant in a common search space while UE is performing the reconfiguration, and UE does not need to wait the UL grant until after the reconfiguration is done. In other words, the reconfiguration and the UL grant occurs in parallel, which reduces access delay for UL data. In an alternative embodiment, BS provides UL grant in RRC reconfiguration message, so that UE does not have to receive UL grant while performing the reconfiguration.

19 Claims, 4 Drawing Sheets

(56) References Cited

U.S. PATENT DOCUMENTS

| | | | |
|---|---|---|---|
| 2013/0343238 A1 | 12/2013 | Seo et al. | 370/280 |
| 2014/0162642 A1 | 6/2014 | Kwon et al. | 455/435.1 |
| 2015/0305065 A1 | 10/2015 | Bai et al. | 370/329 |
| 2016/0381607 A1 | 12/2016 | Zhu et al. | 370/331 |
| 2019/0059031 A1* | 2/2019 | Hahn | H04W 36/08 |
| 2019/0297537 A1* | 9/2019 | Tsai | H04W 76/27 |

OTHER PUBLICATIONS

Taiwan IPO, office action for related TW patent application 108115996 (no English translation is available) dated Jun. 30, 2020 (11 pages).

3GPP TS 36.300 V15.1.0 (Mar. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) *Fig. 4.6.1-2, 10.1.2.1.1-1* *sections 9.1, 10.1.2.1.1, 10.1.6, 11.1, 11.1.1, 18*.

3GPP TS 36.331 V15.1.0 (Mar. 2018), 3rd Generation Partnership Project; Technical Specification Group Radio Access Network; Evolved Universal Terrestrial Radio Access (E-UTRA); Radio Resource Control (RC); Protocol specification (Release 15) *section 5.3.3.3a, 5.3.3.4a*.

* cited by examiner

| Component | Description | Latency [ms] |
|---|---|---|
| 1 | Delay due to RACH scheduling period (1TTI) | 0 |
| 2 | Transmission of RACH Preamble | 1 |
| 3 | Preamble detection and processing in eNB | 2 |
| 4 | Transmission of RA response | 1 |
| 5 | UE Processing Delay (decoding of scheduling grant, timing alignment and C-RNTI assignment + L1 encoding of RRC Connection Resume Request) | 4 |
| 6 | Transmission of RRC Connection Resume Request | 1 |
| 7 | Processing delay in eNB (L2 and RRC) | 3 |
| 8 | Transmission of RRC Connection Resume | 1 |
| 9 | Processing delay in UE of RRC Connection Resume including grant reception | 15-->9 |
| 10 | Transmission of RRC Connection Resume Complete and UP data | 0 |
| | Total delay [ms] | 20 |

FIG. 4

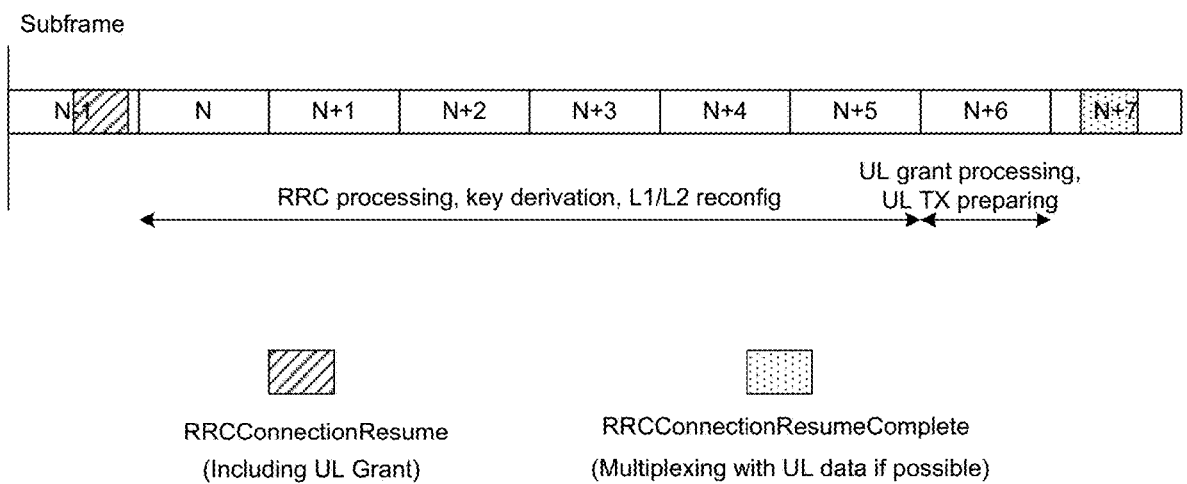

FIG. 5

METHOD TO REDUCE ACCESS DELAY

CROSS REFERENCE TO RELATED APPLICATION

This application claims priority under 35 U.S.C. § 119 from U.S. Provisional Application No. 62/668,882, entitled "Method to Reduce Access Delay," filed on May 9, 2018, the subject matter of which is incorporated herein by reference.

TECHNICAL FIELD

The disclosed embodiments relate generally to wireless communication systems, and, more particularly, to reduce access delay for user equipments (UEs) when performing radio resource control (RRC) connection resume procedure.

BACKGROUND

3GPP Long-Term Evolution (LTE) systems offer high peak data rates, low latency, improved system capacity, and low operating cost resulting from simple network architecture. A 3GPP LTE system also provides seamless integration to older wireless network, such as GSM, CDMA and Universal Mobile Telecommunication System (UMTS). Enhancements to LTE systems are considered so that they can meet or exceed IMA-Advanced fourth generation (4G) standard. One of the key enhancements is to support bandwidth up to 100 MHz and be backwards compatible with the existing wireless network system. In LTE/LTE-A systems, an evolved universal terrestrial radio access network (E-UTRAN) includes a plurality of evolved Node-Bs (eNodeBs or eNBs) communicating with a plurality of mobile stations, referred as user equipments (UEs).

In 3GPP LTE/LTE-A systems, operations could be divided to two radio resource control (RRC) states: RRC_CONNECTED and RRC_IDLE. In RRC_CONNECTED mode, an eNB would keep UE's context (security, id) and process radio resource management (RRM) for that UE. RRM here includes data scheduling, link monitoring (MCS adaption), handover, etc. A UE is ensured to make seamless data transmission with eNB when the UE is in RRC_CONNECTED mode. The eNB may command UE to perform RRM measurement and make handover (HO) decisions after receiving reports that indicate serving cell's signal quality is not good. Inter-eNB negotiation on exchanging UE's information would be handled in RRC_CONNECTED mode.

Since radio resources are limited and network loading is also restricted, it is impossible to keep all UEs in RRC_CONNECTED mode. An eNB may release part of UEs and command them to go to RRC_IDLE mode. Once a UE goes to RRC_IDLE mode, eNB would release UE information or maintain only minimal UE information. RRC_IDLE mode thus has the lowest energy consumption. A UE would perform cell reselection when it finds its camped cell is getting weaker and try to re-synchronize with a new cell. An idle UE will try to resume its RRC connection through an RRC connection resume procedure when data arrives. The procedure comprises: a) random access process to synchronize the uplink timing, b) capabilities negotiations authorizations, and network perform admission control, and c) set up operating parameters if UE is allowable to access the network. In addition, for RRC message transactions via uplink (UL) transmission, the UE needs to request for UL grant from the network.

Based on current LTE specification, it is expected that an RRC state transition would consume a lot of signaling and cause a lot of delay. To reduce the access delay, 3GPP is trying to limit the overall LTE RRC connection resume procedure in 20 ms. Specifically, UE RRC processing time for RRC connection resume message needs to be reduced. After RRC connection resume completed, UE could receive downlink (DL) data immediately. However, when UE is doing reconfiguration for RRC connection resume, the lower layer could not receive UL grant using new configuration. As a result, UE has to wait for the UL grant after the reconfiguration, which creates additional delay for UL data transmission.

To speed up the UL data access, a solution is sought to deliver the UL grant to UE earlier.

SUMMARY

A method to speed up uplink data access during a radio resource control (RRC) reconfiguration procedure is proposed. The processing times of the RRC reconfiguration procedure can be reduced based on control plane (CP) latency evaluation. UE first sends an RRC connection request, and in response receives an RRC reconfiguration (or resume) message from BS. UE then decodes the RRC reconfiguration message and performs reconfiguration. UE also waits for UL grant for transmitting RRC reconfiguration complete with UL data if available. In one embodiment, BS provides the UL grant in a common search space while UE is performing the reconfiguration, and UE does not need to wait the UL grant until after the reconfiguration is done. In other words, the reconfiguration and the UL grant occurs in parallel, which reduces access delay for UL data. In an alternative embodiment, BS provides UL grant in RRC reconfiguration message, so that UE does not have to receive UL grant while performing the reconfiguration.

In one embodiment, a UE transmits a radio resource control (RRC) connection request in a wireless communication network. The UE performs reconfiguration after receiving and decoding an RRC connection reconfiguration message from the network. The UE receives an uplink grant during the reconfiguration, and the UE searches for the uplink grant over a physical downlink control channel (PDCCH) in a common search space. The UE transmits an RRC connection reconfiguration complete message to the network based on the uplink grant.

In one embodiment, a BS receives a radio resource control (RRC) connection request from a user equipment (UE) in a wireless communication network. The BS transmits an RRC connection reconfiguration (or resume) message to the UE. The BS transmits an uplink grant before receiving an RRC connection reconfiguration complete message from the UE, wherein the uplink grant is provided for the UE over a physical downlink control channel (PDCCH) in a common search space. The BS receives the RRC connection reconfiguration complete message from the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 illustrates a latency distribution chart for different components of an RRC connection resume procedure.

FIG. 5 illustrates one embodiment of reducing access delay for an RRC connection resume procedure in accordance with one novel aspect.

DETAILED DESCRIPTION

Reference will now be made in detail to some embodiments of the invention, examples of which are illustrated in the accompanying drawings.

Figure 1:
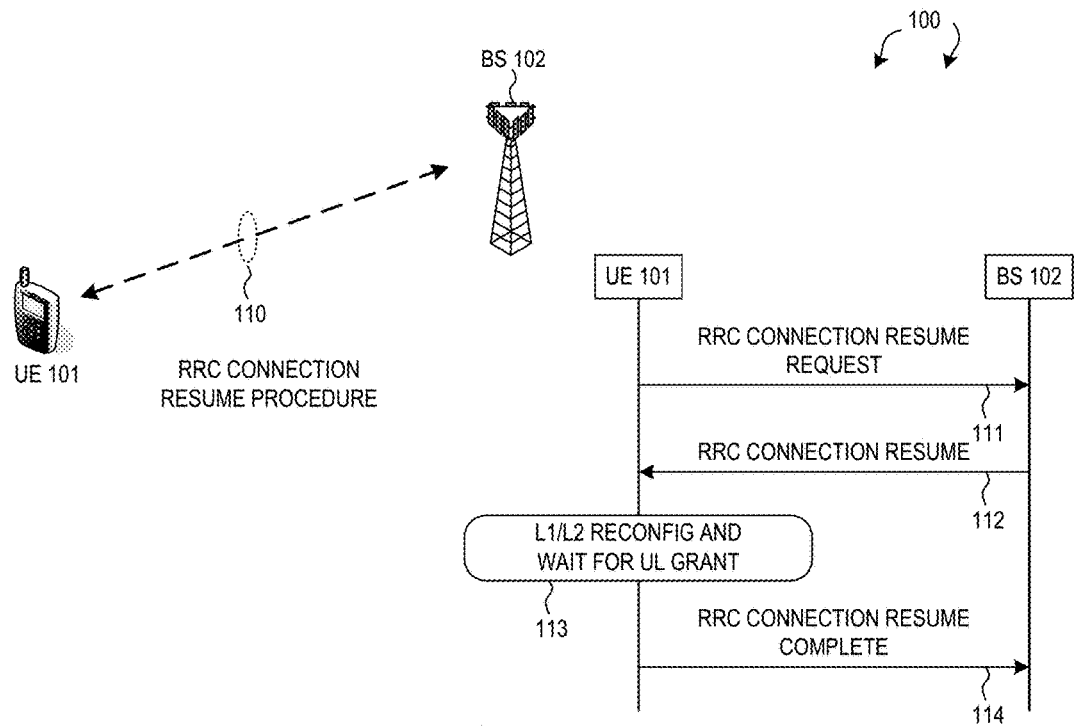
FIG. 1 illustrates a UE performing a radio resource control (RRC) connection resume procedure with reduced access delay in a mobile communication network in accordance with one novel aspect.

FIG. 1 illustrates a user equipment (UE) performing a radio resource control (RRC) connection resume procedure with reduced access delay in a mobile communication network 100 in accordance with one novel aspect. In LTE/LTE-A systems, an evolved universal terrestrial radio access network (E-UTRAN) includes a plurality of base stations, referred as evolved Node-Bs (eNodeBs or eNBs) communicating with a plurality of mobile stations, referred as user equipments (UEs). In next generation 5G new radio (NR) systems, base stations are referred to as gNodeBs or gNBs. Both eNBs and gNBs are referred to as base stations (BSs) in the present invention. Operations for UE could be divided to two radio resource control (RRC) states: RRC_CONNECTED and RRC_IDLE. In RRC_CONNECTED mode, UE establishes a dedicated connection with the network. UE is ensured to make seamless data transmission with BS when the UE is in RRC_CONNECTED mode. Once a UE goes to RRC_IDLE mode, BS would release UE information or maintain only minimal UE information. The RRC_IDLE mode thus has the lowest energy consumption.

In FIG. 1, Mobile communication network 100 is an OFDM/OFDMA system comprising BS 102 and UE 101. Initially, UE 101 camps on a cell and stays in RRC_Idle mode. For data transmission, UE 101 needs to establish an RRC connection with BS 102 and enter in RRC_Connected mode. When there is a downlink packet to be sent from BS to UE, each UE gets a downlink assignment, e.g., a set of radio resources in a physical downlink shared channel (PDSCH). When a UE needs to send a packet to BS in the uplink, the UE gets a grant from the BS that assigns a physical uplink shared channel (PUSCH) consisting of a set of uplink radio resources. The UE gets the downlink or uplink scheduling information from a physical downlink control channel (PDCCH) that is targeted specifically to that UE. The downlink assignment and the uplink grant, carried by PDCCH, is referred to as downlink control information (DCI). UE needs to monitor the PDCCH for the DCI in a UE-specific search space.

Since radio resources and network capacity are limited, it is impossible to keep all UEs in RRC_CONNECTED mode. Inactive UEs are therefore released to RRC_IDLE mode. An idle UE can receive system information broadcasted from BS. An idle UE will try to resume its RRC connection through an RRC connection resume procedure when data arrives. Based on current LTE specification, it is expected that an RRC state transition would consume a lot of signaling and cause a lot of delay. To reduce the access delay, 3GPP is trying to limit the overall LTE RRC connection resume procedure in 20 ms. Specifically, UE RRC processing time for RRC connection resume message needs to be reduced. After RRC connection resume is completed, UE could receive downlink (DL) data immediately. However, when UE is doing reconfiguration for RRC connection resume, the lower layer could not receive UL grant using new configuration, because the UL grant is sent in UE-specific search space. As a result, UE has to wait for the UL grant after the reconfiguration, which creates additional delay for UL data.

In accordance with one novel aspect, a method to speed up UL data access during RRC resume procedure is proposed. In the example of FIG. 1, an RRC connection resume procedure is illustrated as an example. However, the same method is applicable to other procedures such as an RRC connection reconfiguration procedure. In step 111, UE 101 transmits an RRC connection resume request to BS 102. In step 112, BS 102 transmits an RRC connection resume message to UE 101. In step 113, UE 101 performs layer1 and layer2 (L1/L2) reconfiguration based on the RRC connection resume message. Meanwhile, UE 101 also waits for UL grant from BS 102. In one advantageous aspect, BS 102 provides the UL grant in a common search space while UE 101 is performing the L1/L2 reconfiguration, and UE 101 does not need to wait the UL grant until after the L1/L2 reconfiguration is done. In other words, the L1/L2 reconfiguration and the UL grant occurs in parallel, which reduces access delay for UL data transmission. In step 114, UE 101 transmits an RRC connection resume complete and UL data to BS 102. In an alternative embodiment, BS 102 provides UL grant in RRC reconfiguration message, e.g., RRC connection resume message in step 112, so that UE 101 does not have to receive UL grant while performing the L1/L2 reconfiguration in step 113.

Figure 2:
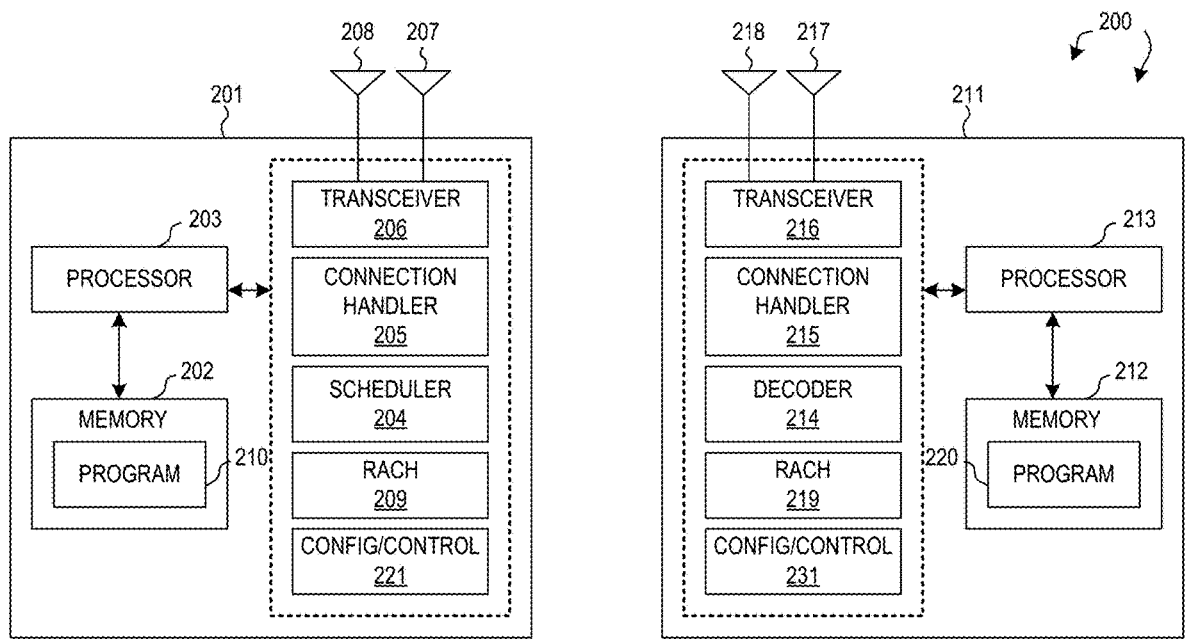
FIG. 2 is a simplified block diagram of a UE and a BS for supporting embodiments of the present invention in accordance with one novel aspect.

FIG. 2 is a simplified block diagram of a BS 201 and a UE 202 for supporting embodiments of the present invention in accordance with one novel aspect. For wireless BS 201, antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in BS 201. Memory 202 stores program instructions and data 210 to control the operations of BS 201.

Similarly, for UE 211, antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in UE 211. Memory 212 stores program instructions and data 220 to control the operations of UE 211. Suitable processors include, by way of example, a special purpose processor, a digital signal processor (DSP), a plurality of microprocessors, one or more microprocessors associated with a DSP core, a controller, a microcontroller, Application specific integrated circuits (ASICs), Field programmable gate array (FPGAs) circuits, and other type of integrated circuit (IC), and/or state machine. A processor, e.g., processor 213 in associated with software may be used to implement and configure various features of UE 201.

BS 201 and UE 211 also include several functional modules and circuits that can be implemented and configured to perform embodiments of the present invention. In the example of FIG. 2, BS 201 comprises a connection handler 205, a scheduler 204, a RACH handling circuit 209, and a configuration and control circuit 221. Similarly, UE 211 comprises a connection handler 215, a decoder circuit 214, a RACH handling circuit 219 and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow BS 201 and UE 211 to perform embodiments of the present invention accordingly.

In one example, UE 211 performs an RRC connection resume procedure with BS 201 via RRC connection handler 215. UE 211 waits for RACH occasion and transmits RACH preamble via RACH handling circuit 219. UE 211 then prepares and transmits RRC connection resume request to BS 201. Upon receiving and decoding the RRC connection resume message via decoder 214, UE 211 performs lower layer L1/L2 reconfiguration, and also waits for UL grant by monitoring PDCCH in common search space. The reconfiguration and UL grant reception are performed in parallel to reduce access delay. Finally, UE 211 sends an RRC connection resume complete message to BS 201.

Figure 3:
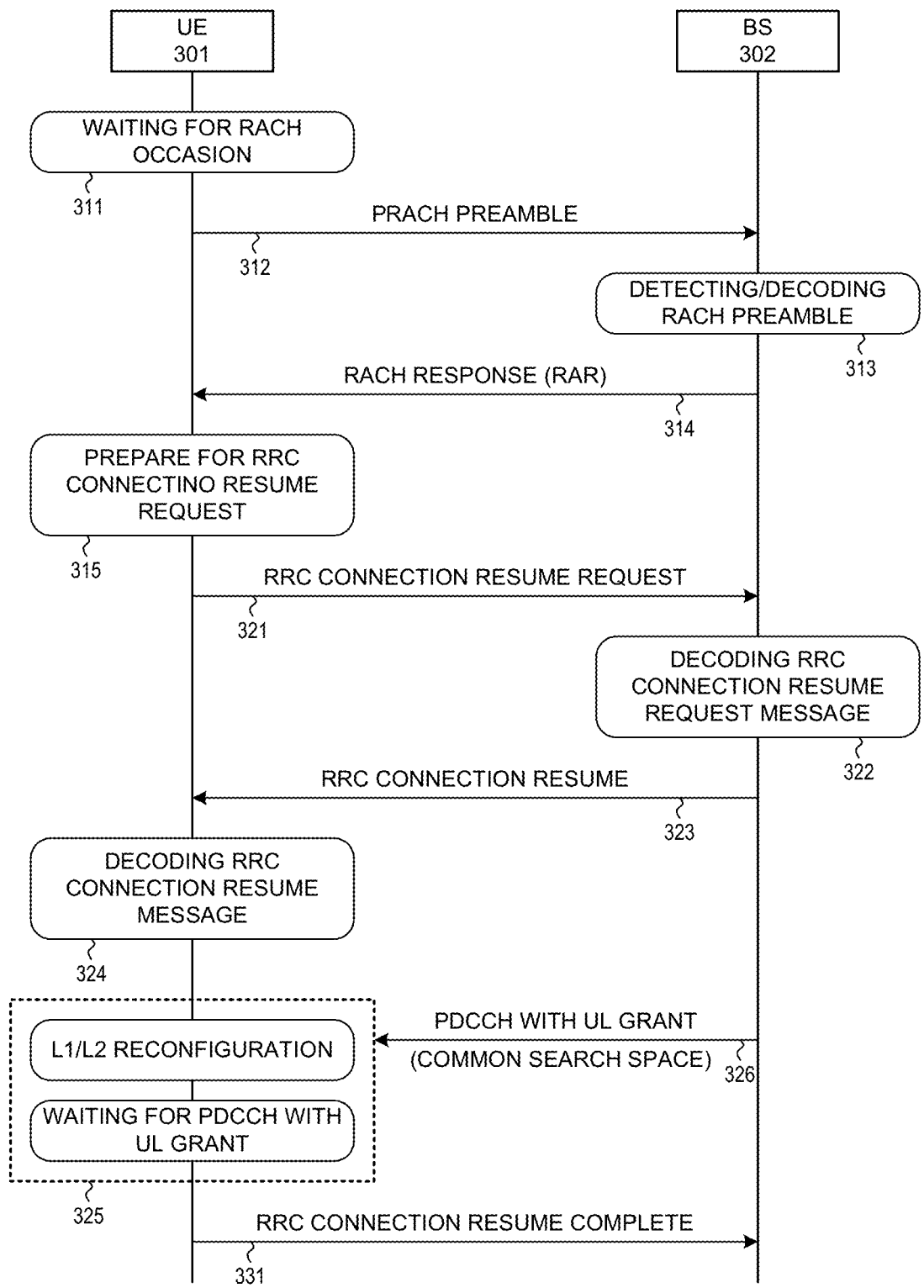
FIG. 3 illustrates a message flow of an RRC connection resume procedure with reduced access delay in accordance with one novel aspect.

FIG. 3 illustrates a message flow of an RRC connection resume procedure with reduced access delay in accordance with one novel aspect. In step 311, UE 301 is in RRC idle mode and waits for a random-access channel (RACH) occasion to transition to RRC connected mode. The transition can be triggered by paging from the network or by upper layer mobile originated (MO) data. In step 312, UE 301 sends a RACH preamble over a selected RACH resource. In step 313, BS 302 detects and decodes the RACH preamble. In step 314, BS 302 transmits a RACH response (RAR) back to UE 301. In step 315, UE 301 prepares for an RRC connection resume request message. In step 321, UE 301 transmits the RRC connection resume request message with UE ID to BS 302. In step 322, BS 302 decodes the RRC connection resume request message. In step 323, BS 302 transmits an RRC connection resume message to UE 301. The RRC connection resume message comprises L1/L2 parameters including radio bearer configuration, measurement configuration, etc. for UE to resume the RRC connection.

In step 324, UE 301 decodes the RRC connection resume message. In step 325, UE 301 processes the RRC connection resume message, which includes lower layer L1/L2 reconfiguration, and waiting for Physical Downlink Control Channel (PDCCH) with UL grant. When UE 301 is performing L1/L2 reconfiguration, it cannot receive UL grant using new configuration if the uplink grant is transmitted via dedicated search space. Before finishing low-layer reconfiguration, UE does not decode PUCCH over the dedicated search space because UE is not ready to conduct advanced transmission yet. Therefore, UE 301 needs to wait for the UL grant after the reconfiguration is completed. In one advantageous aspect, in step 326, BS 302 provides the UL grant carried by PDCCH over a common search space. As a result, while performing L1/L2 reconfiguration, UE 301 is able to in parallel monitor PDCCH for the UL grant over the common search space, which is associated with a UE-specific RNTI, e.g., scrambled by the UE-specific RNTI. Because UE 301 is able to perform the RRC reconfiguration and the PDCCH monitoring for the UL grant in parallel, the processing time for the RRC connection resume message is reduced. In step 331, UE 301 transmits an RRC connection resume complete message to BS 302 and the RRC connection resume procedure is completed.

FIG. 4 illustrates a latency distribution chart for different components of an RRC connection resume procedure. The processing times of the RRC connection resume procedure can be reduced based on control plane (CP) latency evaluation. Table 410 of FIG. 4 shows the targeted CP latency of the RRC connection resume procedure in an LTE or New Radio (NR) system, which is 20 ms. It can be observed that processing time related components, e.g., component 5, 7, and 9 accounts for majority of the access latency. Component 5 corresponds to step 315 of FIG. 3, component 7 corresponds to step 322 of FIG. 3, and component 9 corresponds to step 324 and step 325 of FIG. 3. Based on LTE Release 8 specification, the latency of component 9 was defined to be 15 ms, which is targeted to be 9 ms. Component 9 contributes almost 50% of CP latency time of the RRC connection resume procedure.

For component 9, UE has to do the following: 1) decoding DL packet containing the RRC connection resume message; 2) parsing RRC ASN.1 code and deriving RRC parameters; 3) checking if the RRC parameters are valid and UE is able to comply with the new configuration; and 4) reconfiguring L1/L2 modules. CP latency time of course can be largely reduced if the reconfiguration time can be reduced. Note that some reconfiguration involved hardware modules, such as security engine, may be additional processing time. From UE implementation viewpoint, reconfiguration takes few milliseconds to finish all the necessary steps. The most time-consuming operations are those involving cross-layer reconfiguration and L1/MAC reconfiguration. One way to reduce the RRC processing time is to simplify the reconfiguration operations. For example, during the RRC connection resume procedure, if only L1/L2 baseline settings are configured and no DRX, SPS, CA or MIMO reconfiguration will be triggered, then the processing time can be reduced. The additional reconfiguration can be done after UE enters RRC Connected mode. Furthermore, in the present invention, the UL grant for transmission of RRC connection resume complete and uplink data can be transmitted over common search space with DCI format 0 before the network receives the RRC response message. In this scenario, the UE RRC processing delay can be reduced by eliminating the waiting time for the reception of the UL grant.

FIG. 5 illustrates one embodiment of reducing access delay for an RRC connection resume procedure in accordance with one novel aspect. In the example of FIG. 5, the network provides the UL grant at subframe N−1 in the RRC connection resume message (e.g., step 323 of FIG. 3). The UE will send the RRC connection resume complete message in subframe N+7 (e.g., step 331 of FIG. 3). UE can send uplink data together with the RRC connection resume complete message if the UL grant is large enough and if there are available uplink data. In this scenario, UE does not need to wait and receive the UL grant while doing the reconfiguration (e.g., step 325 of FIG. 3). Note that the UL grant is for both RRC response message and UL data. For example, the UL grant comprises a plurality of parameters including resource block (RB) location, modulation and coding scheme (MCS), HARQ number, timing, grant valid duration. A predefined timing after receiving the RRC connection resume message is specified. UE sends the RRC connection resume complete message and UL data (if available) in the predefined subframe (e.g., 8 subframes or 8 ms in this example).

Figure 6:
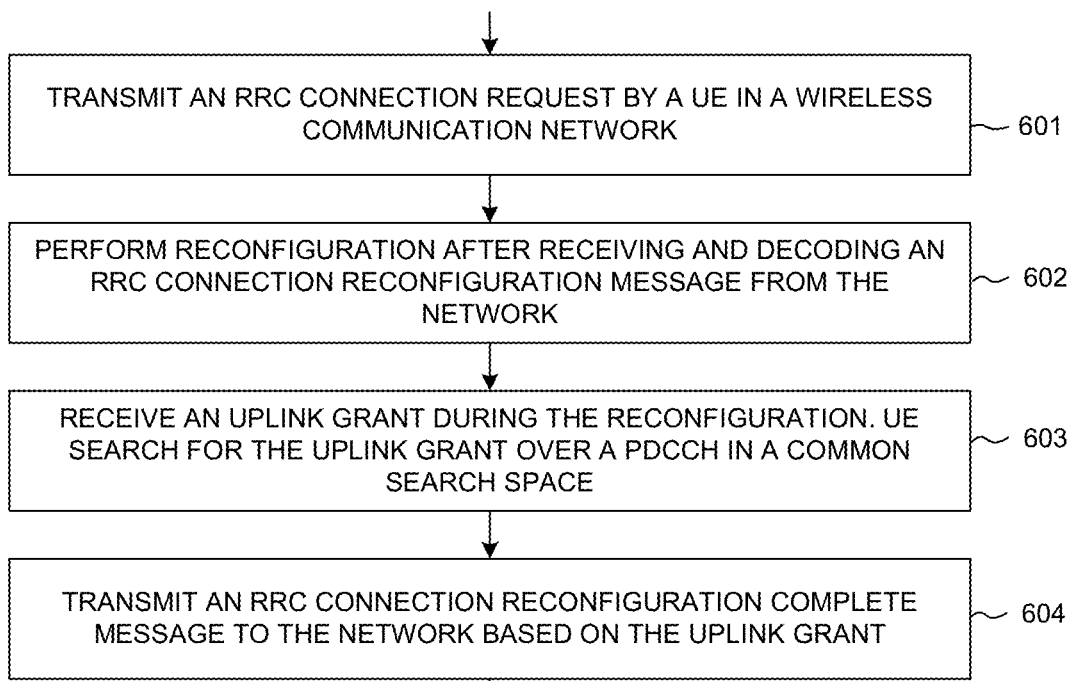
FIG. 6 is a flow chart of a method of reducing access delay for an RRC reconfiguration procedure from UE perspective in a wireless communication network.

FIG. 6 is a flow chart of a method of reducing access delay for an RRC connection resume procedure from UE perspective in a wireless communication network. In step 601, a UE transmits a radio resource control (RRC) connection request in a wireless communication network. In step 602, the UE performs reconfiguration after receiving and decoding an RRC connection reconfiguration message from the network. In step 603, the UE receives an uplink grant during the reconfiguration, and the UE searches for the uplink grant over a physical downlink control channel (PDCCH) in a common search space. In step 604, the UE transmits an RRC connection reconfiguration complete message to the network based on the uplink grant. In one embodiment, the RRC connection reconfiguration message is an RRC connection resume message, and the RRC connection reconfiguration complete message is RRC connection resume complete message.

Figure 7:
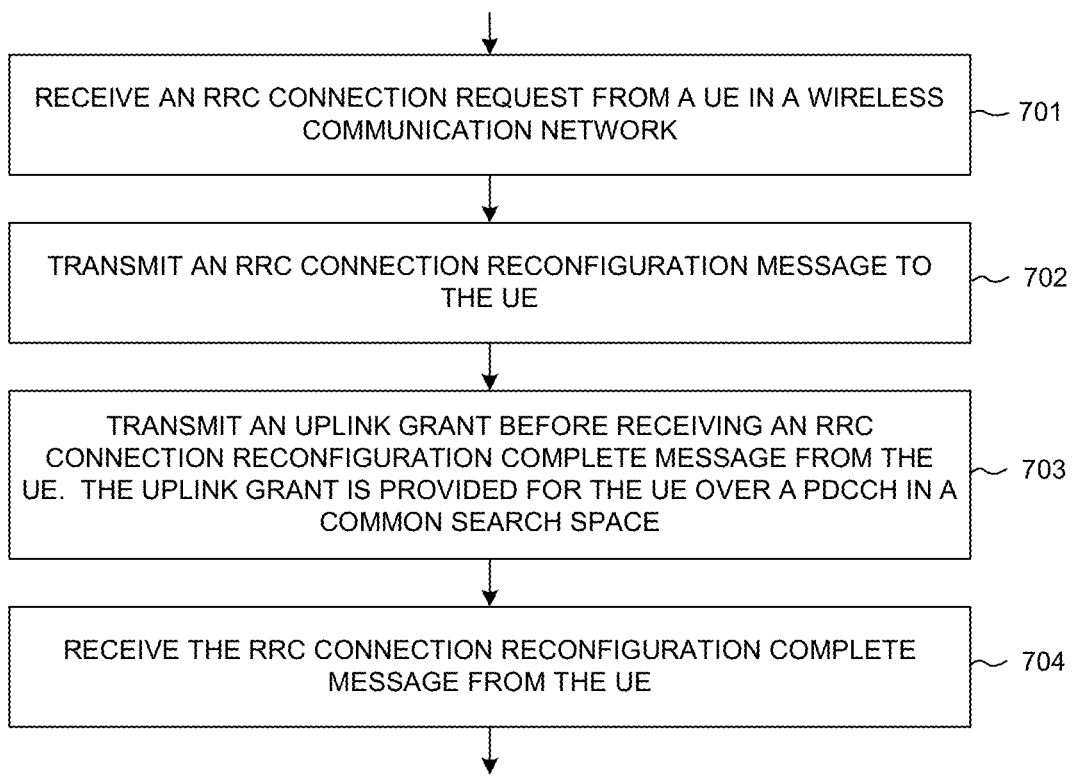
FIG. 7 is a flow chart of a method of reducing access delay for an RRC reconfiguration procedure from BS perspective in a wireless communication network.

FIG. 7 is a flow chart of a method of reducing access delay for an RRC connection resume procedure from BS perspective in a wireless communication network. In step 701, a BS receives a radio resource control (RRC) connection request from a user equipment (UE) in a wireless communication network. In step 702, the BS transmits an RRC connection reconfiguration message to the UE. In step 703, the BS transmits an uplink grant before receiving an RRC connection reconfiguration complete message from the UE, wherein the uplink grant is provided for the UE over a physical downlink control channel (PDCCH) in a common search space. In step 704, the BS receives the RRC connection reconfiguration complete message from the UE. In one embodiment, the RRC connection reconfiguration message is an RRC connection resume message, and the RRC connection reconfiguration complete message is RRC connection resume complete message.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    transmitting a radio resource control (RRC) connection request by a user equipment (UE) in a wireless communication network;
    performing reconfiguration after receiving and decoding an RRC connection reconfiguration message from the network;
    receiving an uplink grant during the reconfiguration, wherein the UE searches for the uplink grant over a physical downlink control channel (PDCCH) in a common search space; and
    transmitting an RRC connection reconfiguration complete message to the network based on the uplink grant.

2. The method of claim 1, wherein the UE performs the reconfiguration and searches for the uplink grant over the PDCCH in parallel.

3. The method of claim 1, wherein the RRC connection reconfiguration message is an RRC connection resume message, and the RRC connection reconfiguration complete message is an RRC connection resume complete message.

4. The method of claim 1, wherein the reconfiguration involves a Layer 1 (PHY) layer and a Layer 2 (MAC) layer reconfiguration parameters.

5. The method of claim 1, wherein the uplink grant over the PDCCH is associated with a UE-specific radio network temporary identity (RNTI) in the common search space.

6. The method of claim 1, wherein the uplink grant carries parameters including resource block location, modulation and coding scheme (MCS), Hybrid Automatic Repeat Request (HARQ) number, timing, and grant valid duration.

7. The method of claim 6, wherein the UE transmits uplink data together with the RRC connection reconfiguration complete message based on the uplink grant.

8. A User Equipment (UE), comprising:
    a transmitter that transmits a radio resource control (RRC) connection request in a wireless communication network;
    a reconfiguration circuit that performs reconfiguration after receiving and decoding an RRC connection reconfiguration message from the network; and
    a receiver that receives an uplink grant during the reconfiguration, wherein the UE searches for the uplink grant over a physical downlink control channel (PDCCH) in a common search space, and wherein the UE transmits an RRC connection reconfiguration complete message to the network based on the uplink grant.

9. The UE of claim 8, wherein the UE performs the reconfiguration and searches for the uplink grant over the PDCCH in parallel.

10. The UE of claim 8, wherein the RRC connection reconfiguration message is an RRC connection resume message, and the RRC connection reconfiguration complete message is an RRC connection resume complete message.

11. The UE of claim 8, wherein the reconfiguration involves a Layer 1 (PHY) layer and a Layer 2 (MAC) layer reconfiguration parameters.

12. The UE of claim 8, wherein the uplink grant over the PUCCH is associated with a UE-specific radio network temporary identity (RNTI) in the common search space.

13. The UE of claim 8, wherein the uplink grant carries parameters including resource block location, modulation and coding scheme (MCS), Hybrid Automatic Repeat Request (HARQ) number, timing, and grant valid duration.

14. The UE of claim 13, wherein the UE transmits uplink data together with the RRC connection reconfiguration complete message based on the uplink grant.

15. A method, comprising:
    receiving a radio resource control (RRC) connection request from a user equipment (UE) by a base station in a wireless communication network;
    transmitting an RRC connection reconfiguration message to the UE;
    transmitting an uplink grant before receiving an RRC connection reconfiguration complete message from the UE, wherein the uplink grant is provided for the UE over a physical downlink control channel (PDCCH) in a common search space, wherein the base station transmits the uplink grant and the RRC connection reconfiguration message simultaneously; and
    receiving the RRC connection reconfiguration complete message from the UE.

16. The method of claim 15, wherein the RRC connection reconfiguration message is an RRC connection resume message, and the RRC connection reconfiguration complete message is an RRC connection resume complete message.

17. The method of claim 15, wherein the uplink grant over the PUCCH is associated with a UE-specific radio network temporary identity (RNTI) in the common search space.

18. The method of claim 15, wherein the uplink grant carries parameters including resource block location, modulation and coding scheme (MCS), Hybrid Automatic Repeat Request (HARQ) number, timing, and grant valid duration.

19. The method of claim 18, wherein the base station receives uplink data together with the RRC connection reconfiguration complete message from the UE.

\* \* \* \* \*